(12) United States Patent
Furuichi et al.

(10) Patent No.: US 11,105,646 B2
(45) Date of Patent: Aug. 31, 2021

(54) PROVIDING NAVIGATION SERVICES USING CONTEXT-AWARE TRAJECTORY ANALYSIS

(71) Applicant: International Business Machines Corporation, Armonk, NY (US)

(72) Inventors: Sanehiro Furuichi, Setagaya-ku (JP); Shoichiro Wantanabe, Tokyo (JP); Yasutaka Nishimura, Yamato (JP); Kenichi Takasaki, Shibuya (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 16/386,680

(22) Filed: Apr. 17, 2019

(65) Prior Publication Data
US 2020/0333153 A1    Oct. 22, 2020

(51) Int. Cl.
*G01C 21/34* (2006.01)
*G01C 21/36* (2006.01)
*H04W 4/02* (2018.01)

(52) U.S. Cl.
CPC ..... *G01C 21/3492* (2013.01); *G01C 21/3484* (2013.01); *G01C 21/3691* (2013.01); *H04W 4/025* (2013.01)

(58) Field of Classification Search
CPC ............ G01C 21/3492; G01C 21/3484; G01C 21/3691
USPC ......................................................... 701/410
See application file for complete search history.

(56) References Cited

U.S. PATENT DOCUMENTS

| | | | |
|---|---|---|---|
| 8,290,699 B2 | 10/2012 | Horiguchi et al. | |
| 8,417,446 B2 | 4/2013 | Mays | |
| 9,214,099 B2 | 12/2015 | Usui et al. | |
| 9,436,703 B2 | 9/2016 | Choi | |

(Continued)

FOREIGN PATENT DOCUMENTS

| | | |
|---|---|---|
| CN | 105716620 A | 6/2016 |
| CN | 10873749 A | 11/2018 |
| JP | 6377090 B2 | 8/2018 |

OTHER PUBLICATIONS

International Search Report and Written Opinion in corresponding International Application No. PCT/IB2020/052604, dated Jul. 15, 2020, 9 pages.

(Continued)

*Primary Examiner* — Isaac G Smith
(74) *Attorney, Agent, or Firm* — Edell, Shapiro & Finnan, LLC

(57) ABSTRACT

A computer system provides navigation services. Route data is processed to extract a plurality of routes, wherein each route comprises a plurality of links and nodes. A partition layer is generated for a map including the plurality of links and nodes of the routes, wherein the partition layer comprises a plurality of meshes each containing links and nodes of the map. A context is processed to remove invalid links and nodes from the map based on the context. The partition layer is updated by merging a subset of the plurality of meshes in response to the removal of the invalid links and nodes. A navigation service is provided for the plurality of routes based on the updated partition layer of the map. Embodiments of the present invention further include a method and program product for providing navigation services in substantially the same manner described above.

25 Claims, 7 Drawing Sheets

(56) References Cited

U.S. PATENT DOCUMENTS

| | | |
|---|---|---|
| 9,578,093 B1 | 2/2017 | Gotoh et al. |
| 2016/0092621 A1* | 3/2016 | Hu .......................... G06F 30/18 703/6 |
| 2016/0252355 A1* | 9/2016 | Mays ................... G01C 21/206 701/533 |

OTHER PUBLICATIONS

Unknown, "Grid Square System", National Survey on the Natural Environment, 3 pages, retrieved from internet Jul. 30, 2018, http://www.biodic.go.jp/english/kiso/col_mesh.html.

* cited by examiner

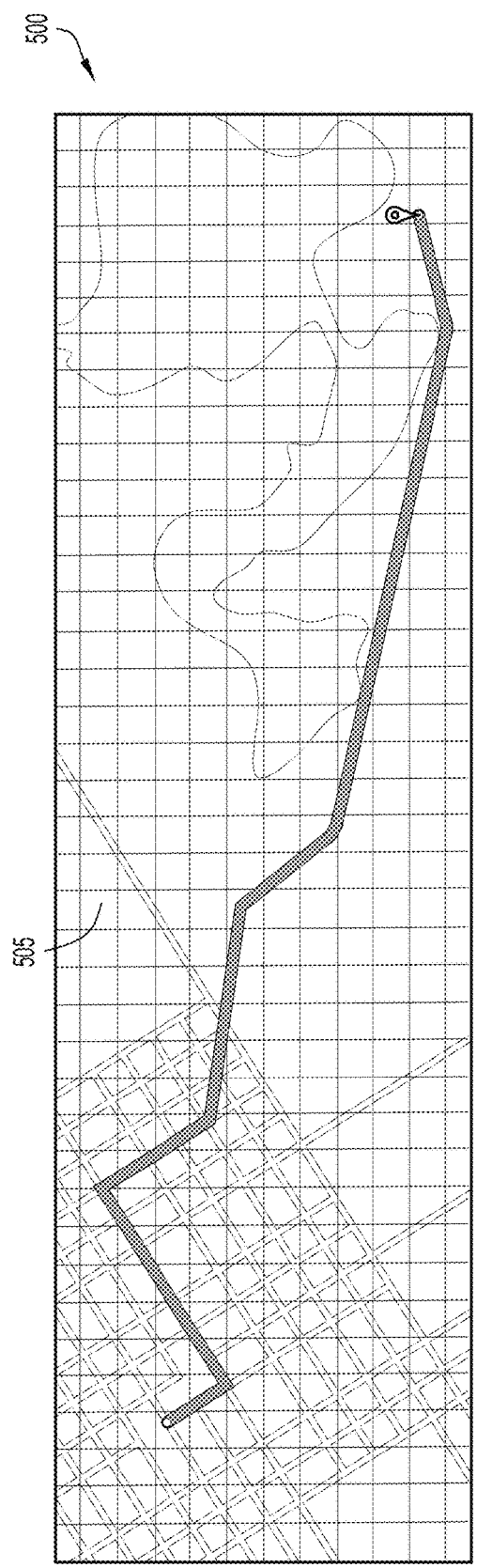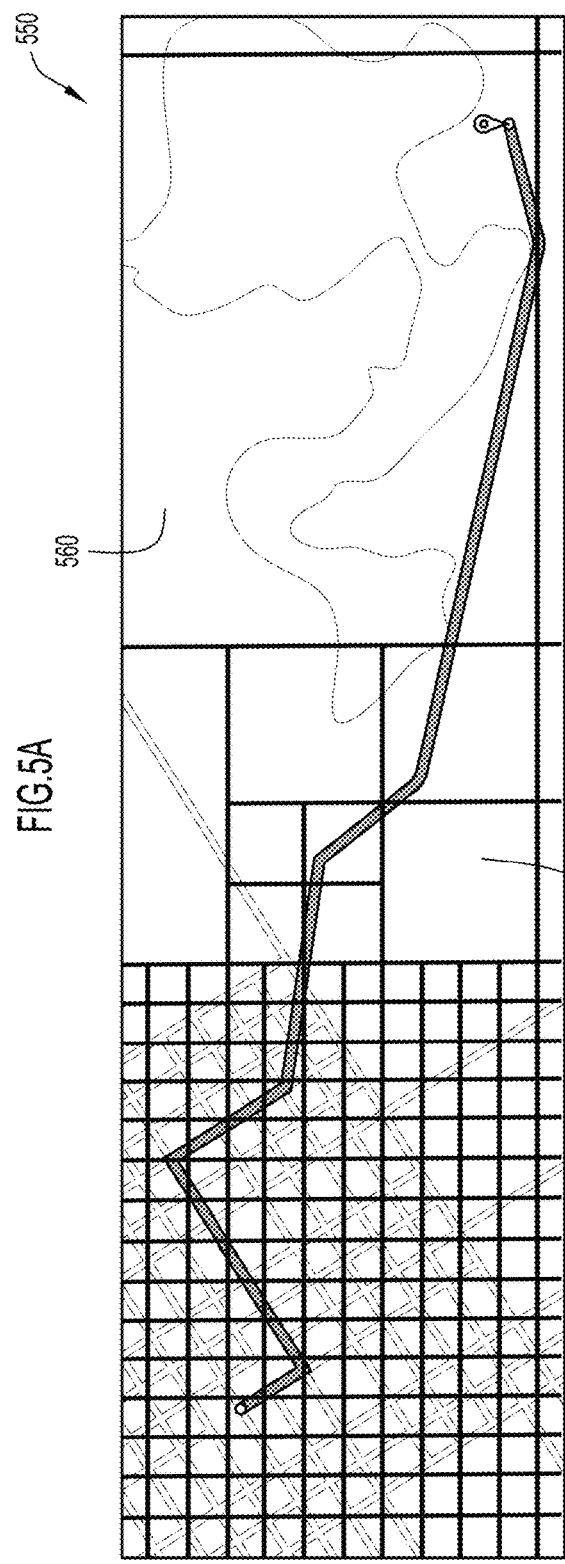

PROVIDING NAVIGATION SERVICES USING CONTEXT-AWARE TRAJECTORY ANALYSIS

BACKGROUND

1. Technical Field

Present invention embodiments relate to providing navigation services, and more specifically, to providing location-based navigation services that are based on a context-aware trajectory analysis.

2. Discussion of the Related Art

Location-based navigation services may include any services that provide information related to a travel route of a vehicle, such as travel directions, estimated travel time, route conditions, and the like. With the spread of location-aware mobile devices and connected vehicles, the trajectories of vehicles in a geographic area may be analyzed to enhance the accuracy of a navigation service. As the accuracy of a navigation service increases, the trajectory analysis that supports the service becomes computationally expensive. However, efforts to lessen the computational requirements of a navigation service typically also reduce the accuracy of the service.

SUMMARY

According to one embodiment of the present invention, a computer system provides navigation services. Route data is processed to extract a plurality of routes, wherein each route comprises a plurality of links and nodes. A partition layer is generated for a map including the plurality of links and nodes of the routes, wherein the partition layer comprises a plurality of meshes each containing links and nodes of the map. A context is processed to remove invalid links and nodes from the map based on the context. The partition layer is updated by merging a subset of the plurality of meshes in response to the removal of the invalid links and nodes. A navigation service is provided for the plurality of routes based on the updated partition layer of the map. Thus, present invention embodiments reduce the amount of computational resources required to provide a navigation service without sacrificing the accuracy of the navigation service. By accounting for contexts, such as traffic conditions for the time of day, present invention embodiments may omit certain links and nodes from processing, thereby further reducing the computational requirements for a geographic area.

Various other embodiments of the present invention will now be discussed. In some embodiments, the navigation service comprises one or more of: real-time danger avoidance, and future traffic prediction. Thus, a navigation service may provide assistance while avoiding any dangerous situations and accounting for future traffic events, such as congestion. In some embodiments, the context is one or more of: a time and a day of a week, a weather condition, a vehicle type, and a traffic quantity. By removing links and nodes that are rendered invalid due to one or more contexts, the computational requirements for providing a navigation service are reduced. In some embodiments, generating the partition layer further comprises providing an initial layer comprising a plurality of meshes of equal size, identifying groups of adjacent meshes, wherein each group collectively includes a same number of links and nodes as a mesh in the group that has a highest number of links and nodes, and merging each identified group of adjacent meshes. By merging meshes, the overall number of meshes is reduced, which reduces the computational requirements for providing a navigation service that covers a geographical area. In some embodiments, merging a group of adjacent meshes generates a merged mesh having a level of granularity that is coarser than the levels of granularity of the meshes of the group of adjacent meshes. Merging meshes to generate a merged mesh having a coarser level of granularity enables navigation services to be provided to a larger area while requiring an amount of computational resources that would otherwise be used to provide navigation services to a smaller area. In some embodiments, a shape of a mesh of the plurality of meshes comprises a quadrilateral. Using quadrilateral-shaped meshes simplifies the merger process by ensuring that the shapes and/or sizes merged meshes can be easily predicted. In some embodiments, the subset of the plurality of meshes comprises one or more groups of meshes, wherein each group of meshes collectively includes a same number of links and nodes as a mesh in the group that has a highest number of links and nodes. By merging meshes such that each mesh has a same number of links and nodes, the processing requirements for providing a navigation service may be spread out evenly across the meshes. In some embodiments, the plurality of routes share a same origin and destination. When routes share an origin and destination, users traveling along the routes may utilize navigation services that benefit from shared computations for the geographical area encompassed by the routes, thereby reducing the overall amount computational requirements. In some embodiments the route data is received from a plurality of mobile devices, and the route data that is received from each mobile device comprises one or more of: a location of the mobile device, and a velocity of the mobile device. By receiving route data from multiple mobile sources, present invention embodiments may provide navigation services that benefit from more accurate and recent information. Embodiments of the present invention further include a method and program product for providing navigation services in substantially the same manner described above.

BRIEF DESCRIPTION OF THE DRAWINGS

Generally, like reference numerals in the various figures are utilized to designate like components.

FIGS. 5A and 5B are map representations presented with partition layers in accordance with an embodiment of the present invention;

DETAILED DESCRIPTION

Figure 1:
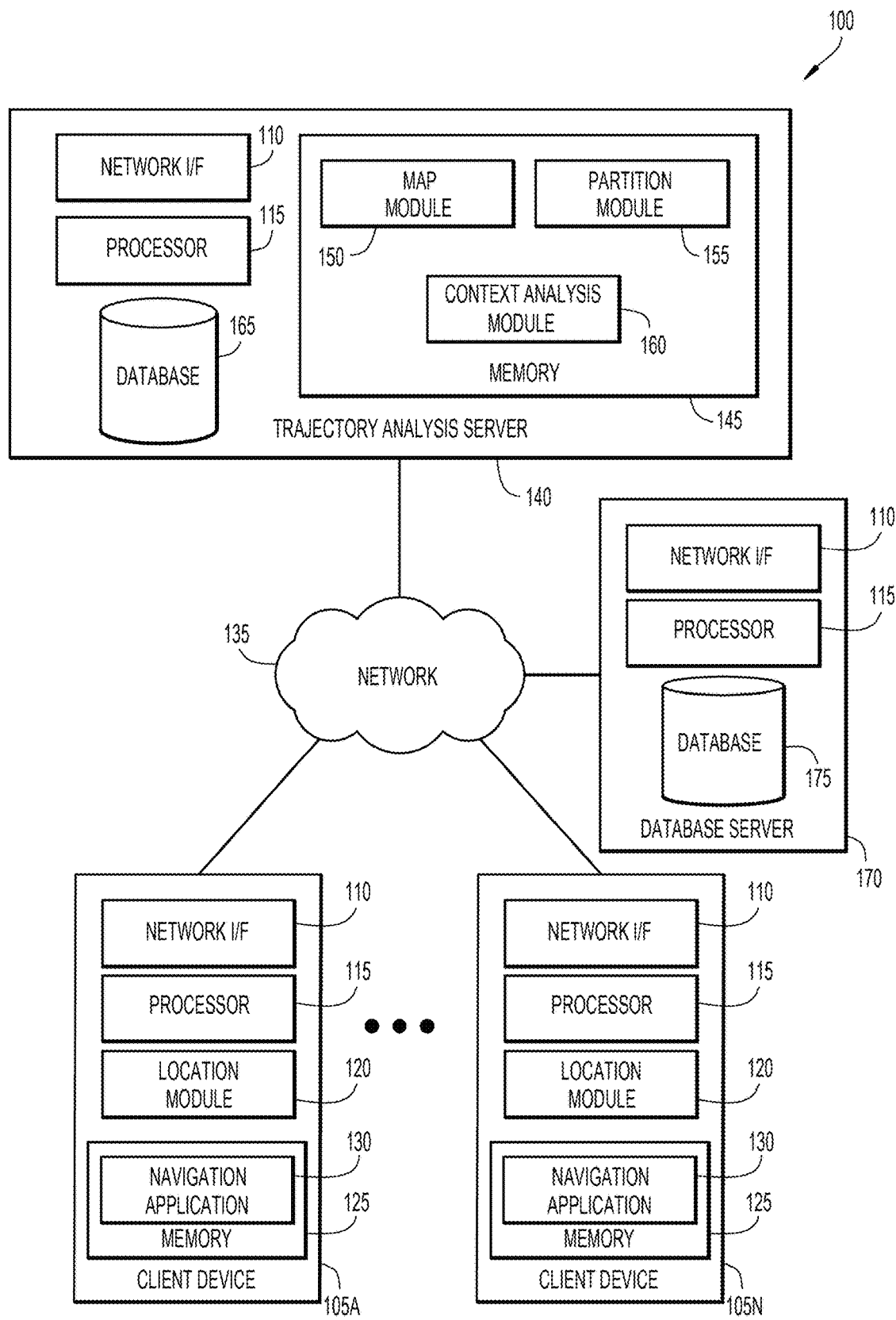
FIG. 1 is a block diagram depicting a computing environment for providing navigation services in accordance with an embodiment of the present invention.

Present invention embodiments relate to providing navigation services, and more specifically, to providing location-based navigation services that are based on a context-aware trajectory analysis. A navigation service may provide real-time information relating to a vehicle's route that is based on factors such as driving conditions, traffic, and the like. For example, a navigation service may prompt a driver to take an alternate route because of a road closure or a traffic jam ahead. A navigation service may provide information to a user device or, in the case of a self-driving vehicle, may integrate into an autonomous navigation system.

In order to support accurate, real-time navigation services, a large volume of information relating to a given geographical area must be collected and processed. The information may be collected from multiple mobile devices in the geographical area. For example, devices such as smartphones may provide location information to a system, including a device's position at a moment in time. By analyzing the trajectories of multiple mobile devices, a navigation service can identify present traffic conditions and predict future conditions.

To provide accurate services for a geographical area, the area may be divided into smaller elements that are processed separately. In general, when a geographical area is divided into finely-grained elements, the accuracy of a navigation service's analysis increases, but so do the computational requirements of the service. For regions where road networks are complex, such as urban areas, finely-grained elements may be required. However, in rural areas, more coarsely-grained elements are suitable. Present invention embodiments divide an area into variously-sized meshes that are based on a road network's complexity. The size of each mesh may be optimized according to the number of links and nodes (e.g., roads and junctions) in the mesh. For example, high-complexity regions may be processed using many smaller meshes, and low-complexity regions may be processed using fewer, larger meshes. Thus, present invention embodiments reduce the amount of computational resources required to provide a navigation service without sacrificing the accuracy of the service. Present invention embodiments also factor in contexts, such as traffic conditions for the time of day, in order to omit certain links and nodes from processing, thereby further reducing the computational requirements for a geographic area. For example, in an urban region where traffic quantity is extremely low during the evening, coarsely-grained meshes may be applied despite the road network density for the region being high. Thus, present invention embodiments provide navigation services for various applications, such as fleet management systems in which long-distance route searching and navigation is constantly employed. Additionally, navigation services may support public transportation systems, by providing context-aware operation management, as well as traffic control systems, which utilize real-time traffic predictions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for providing navigation services in accordance with an embodiment of the present invention. As depicted, computing environment 100 includes a plurality of client devices 105A-105N, a trajectory analysis server 140, and a database server 170. It is to be understood that the functional division among components of computing environment 100 have been chosen for purposes of explaining present invention embodiments and is not to be construed as a limiting example.

Each client device 105A-105N includes a network interface 110, at least one processor 115, a location module 120, and memory 125, which includes a navigation application 130. User device 105 may include any mobile computing device, such as a laptop computer, a tablet computer, a netbook computer, a personal digital assistant (PDA), a smart phone, or any programmable mobile electronic device capable of executing computer readable program instructions. Network interface 110 enables components of each client device 105A-105N to send and receive data over a network, such as network 135. Each client device 105A-105N may include internal and external hardware components, as depicted and described in further detail with respect to FIG. 7.

Location module 120 may include any mechanism for determining a present location of a client device. Location module 120 may receive one or more signals from ground-based, air-based, and/or satellite-based services in order to calculate a present position. In some embodiments, location module 120 is equipped to receive Global Positioning System (GPS) signals to determine the location of a client device 105. The location of each client device 105A-105N may be described in terms of a latitude, a longitude, and/or an elevation.

Navigation application 130 may include one or more modules or units to perform various functions of present invention embodiments described below. Navigation application 130 may be implemented by any combination of any quantity of software and/or hardware modules or units, and may reside within memory 125 of each client device 105 for execution by a processor, such as processor 115.

Navigation application 130 may present information relating to navigation to a user of user device 105. In general, navigation application 130 may receive information from a navigation service that relates to a user's trajectory. In some embodiments, navigation application 130 presents a real-time visual map and/or directions to a user to facilitate travel to a user-provided or other destination. For example, navigation application 130 may present a route to a user, may provide warnings of upcoming traffic events, conditions, or hazards, and the like. A user may provide information to navigation application 130, including the user's route or destination, the type of vehicle in which the user is traveling, and travel preferences, such as a preference to avoid toll roads, a preference to avoid highways, and the like.

Network 135 may include a local area network (LAN), a wide area network (WAN) such as the Internet, or a combination of the two, and includes wired, wireless, or fiber optic connections. In general, network 135 can be any combination of connections and protocols known in the art that will support communications between each client device 105, trajectory analysis server 140, and/or database server 170 via their respective network interfaces 110 in accordance with embodiments of the present invention.

Trajectory analysis server 140 includes a network interface 110, at least one processor 115, memory 145, and a database 165. Memory 145 includes a map module 150, a partition module 155, and a context analysis module 160. In various embodiments of the present invention, trajectory analysis server 140 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of trajectory analysis server 140 to send and receive data over a network, such as network 135. In general, trajectory analysis server 140 analyzes trajectories of users and contexts of the trajectories to provide navigation services. Trajectory analysis server 140 may include internal and external hardware components, as depicted and described in further detail with respect to FIG. 7.

Map module 150, partition module 155, and context analysis module 160 may include one or more modules or units to perform various functions of present invention embodiments described below. Map module 150, partition module 155, and context analysis module 160 may be implemented by any combination of any quantity of software and/or hardware modules or units, and may reside within memory 145 of trajectory analysis server 140 for execution by a processor, such as processor 115.

Map module 150 may receive and process roadway information for one or more geographical areas. In particular, map module 150 may process roadway information to identify nodes (e.g., junctions) and links (e.g., roadways) between nodes. Thus, map module 150 may output one or more maps comprising links and nodes for a selected area. Map module 150 may receive roadway information from a database, such as database 175 of database server 170. In some embodiments, map module 150 retrieves roadway information from a Geographic Information System (GIS). Map module 150 may receive updated roadway information according to a predetermined schedule or on an ad hoc basis when updated map information becomes available. For example, when a new highway is opened, map module 150 may receive updated roadway information, which map module 150 processes to identify new links and/or nodes.

Partition module 155 may process a map that is output by map module 150 by dividing the map according to its links and nodes. In particular, partition module 155 may generate a partition layer for a map that includes a plurality of meshes, each corresponding to a particular region of the map. Each mesh may include one or more links and/or nodes, and may conform to any shape. In some embodiments, meshes are polygons, such as quadrilaterals; in further embodiments, meshes are rectangular- or square-shaped. Partition module 155 may generate a partition layer by generating an initial layer that partitions a map into meshes of equal size at high particular granularity level. For example, the initial layer may be a grid in which each mesh is a square mesh encompassing a same area. The length of the sides of each mesh may be a predetermined value, such as one hundred feet or one mile. In some embodiments, the size of the initial meshes and the alignment of the meshes may correspond to a land surveying system; for example, the meshes may correspond to sections, townships, or ranges, or subdivisions thereof, of the Public Land Survey System.

Partition module 155 may modify the meshes in the initial layer to generate a partition layer based on a static division method. In particular, meshes may be merged so that each mesh of a map encompasses a same number of links and/or nodes. For example, meshes may be merged such that the resulting partition layer comprises meshes that each contain three nodes and two links. Since densely-populated areas may have more complex roadways than rural areas, the resulting partition layer may feature many, smaller meshes corresponding to urban regions, and fewer, larger meshes that correspond to rural areas. A partition layer based on a static division method may be further modified according to one or more contexts. In particular, context analysis module 160 may process a context to provide instructions to remove certain nodes and links, and partition module 155 may modify a partition layer accordingly by further merging affected meshes. For example, if a particular mesh no longer contains any links or nodes, it may be merged with an adjacent mesh. The process of generating and modifying partition layers will be depicted and described in further detail below with reference to FIGS. 2 and 3.

Context analysis module 160 may receive one or more contexts for a trajectory and process each context to identify links and nodes that may be invalid due to a particular context. A context may include any event or condition that enables links and nodes to be removed from consideration. Contexts may include particular times of day and days of the week, weather conditions, vehicle types, and traffic quantities. A link may be removed if the traffic quantity on the link is zero or nearly zero. For example, if a particular roadway is so congested that it is unusable, or alternatively, if the roadway sees no traffic, then a link corresponding to the roadway may be removed from consideration. A node may be removed if all links leading to the node are also removed.

Context analysis module 160 may analyze a time of day or day of week to determine whether links and roads may be removed based on the predicted traffic for the link at the present time. Context analysis module 160 may receive weather information or traffic quantity information from a database, such as database 165 of trajectory analysis server 140 or database 175 of database server 170. To process a vehicle type, context analysis module 160 may receive a vehicle type from a user, e.g., via navigation application 130 of a client device 105. If the vehicle cannot travel along a particular link, context analysis module 160 may then remove the link. For example, if a vehicle type indicates that the vehicle is over a certain weight or size, then context analysis module 160 may identify links that cannot support the weight or size of the vehicle. After context analysis module 160 processes one or more contexts to identify links and nodes that can be removed, partition module 155 may modify a partition layer to account for the removal of links and nodes.

Database 165 may include any non-volatile storage media known in the art. For example, database 165 can be implemented with a tape library, optical library, one or more independent hard disk drives, or multiple hard disk drives in a redundant array of independent disks (RAID). Similarly, data on database 165 may conform to any suitable storage architecture known in the art, such as a file, a relational database, an object-oriented database, and/or one or more tables. Database 165 may store data relating to the generation of partition layers based on context-aware trajectory analyses, including maps, partition layers generated by the static division method, context information, and context-specific partition layers.

Database server 170 includes a network interface 110, at least one processor 115, and a database 175. In various embodiments of the present invention, database server 170 may include a laptop computer, a tablet computer, a netbook computer, a personal computer (PC), a desktop computer, a personal digital assistant (PDA), a smart phone, or any programmable electronic device capable of executing computer readable program instructions. Network interface 110 enables components of database server 170 to send and receive data over a network, such as network 135. Database server 170 may include internal and external hardware components, as depicted and described in further detail with respect to FIG. 7.

Database 175 may include any non-volatile storage media known in the art. For example, database 175 can be implemented with a tape library, optical library, one or more independent hard disk drives, or multiple hard disk drives in a redundant array of independent disks (RAID). Similarly, data on database 175 may conform to any suitable storage architecture known in the art, such as a file, a relational database, an object-oriented database, and/or one or more tables. Database 175 may store data relating to contexts, such as weather information, traffic information, including recurring traffic patterns, and the like. In some embodiments, database server 170 is a GIS server and database 175 stores geographical information, including roadway information, for a given area.

Figure 2:
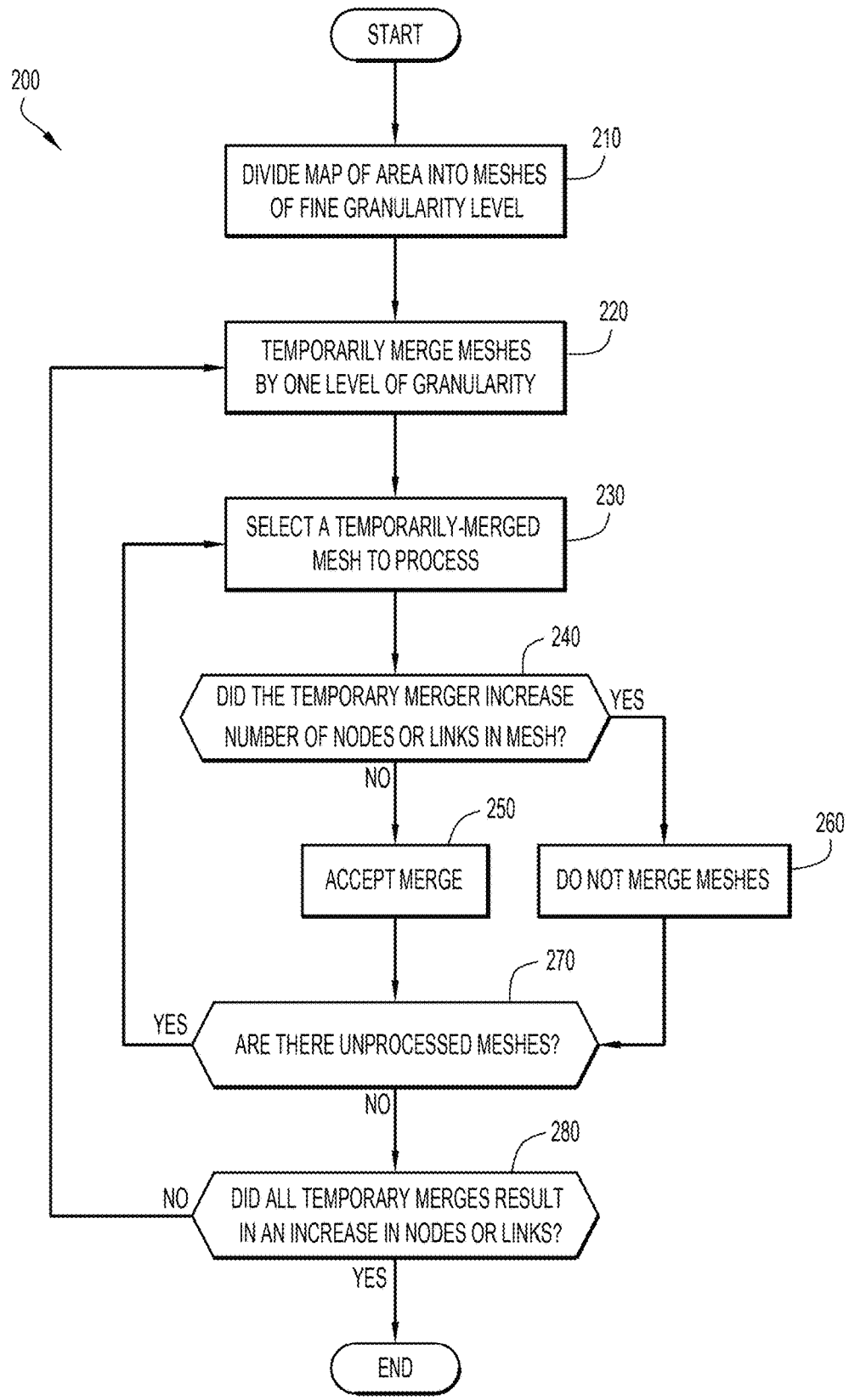
FIG. 2 is a flow chart depicting a method of generating a partition layer via static division in accordance with an embodiment of the present invention.

FIG. 2 is a flow chart depicting a method 200 of generating a partition layer via static division in accordance with an embodiment of the present invention.

A map of an area is divided into a plurality of meshes at a fine level of granularity at operation 210. The map may correspond to a geographic area in which one or more routes are located. Map module 150 may first produce a map that includes nodes that are connected by links. Partition module 155 may then generate an initial layer that includes a grid of meshes. Each mesh in the initial layer may be sized according to a fine level of granularity. The granularity of a mesh refers to the size of the mesh: at a fine level of granularity, each mesh is a smaller size, and as meshes are merged together to form larger meshes, the level of granularity becomes coarser. For example, at a fine level of granularity, each mesh may be a square with sides that are half of a mile in length; merging together four of these meshes to advance a level of granularity may produce a larger square mesh having sides that are each one mile in length. The fine level of granularity may correspond to a predetermined size. In some embodiments, the size of meshes in the initial layer is based on the overall size of the map. In particular, the length of a side of each mesh may be a percentage of the overall length of the map in one dimension. For example, each mesh in the initial layer may have sides that are 5% of the length of a map.

Meshes are temporarily merged by one level of granularity at operation 220. Partition module 155 may temporarily merge two or more adjacent meshes to form a larger mesh at a coarser level of granularity. In some embodiments, partition module 155 only merges meshes if the merger would produce a mesh that is either rectangular or square in shape.

A temporarily-merged mesh is selected for processing at operation 230. Partition module 155 may select an unprocessed mesh that has resulted from a temporary merge operation. At operation 240, partition module 155 determines whether the temporary merger resulted in an increase in the number of links and/or nodes in the merged mesh as compared to the constituent mesh having the highest number of links and/or nodes. The positioning of the initial layer of meshes may result in some meshes that contain more nodes and/or links than other meshes. If two meshes can be merged without increasing the number of links and/or nodes in the merged mesh as compared to the constituent mesh having the highest number of links and/or nodes, the temporary merge operation is accepted at operation 250. Otherwise, the temporary merge operation is discarded and the meshes are not merged at operation 260. Thus, any mesh that does not contain any links or nodes may be merged with a mesh that does.

Operation 270 determines whether there are any remaining unprocessed meshes. If there are temporarily-merged meshes that have not yet been processed, then method 200 returns to operation 230 to process another temporarily-merged mesh.

Operation 280 determines whether all of the temporary merge operations resulted in an increase in the number of nodes and/or links (e.g., operation 280 determines whether the outcome of operation 240 is "YES" for all of the temporarily-merged nodes that were processed). Thus, partition module 155 may output a partition layer that comprises meshes which may be sized according to various levels of granularity, but may each contain a same number of links and nodes.

Figure 3:
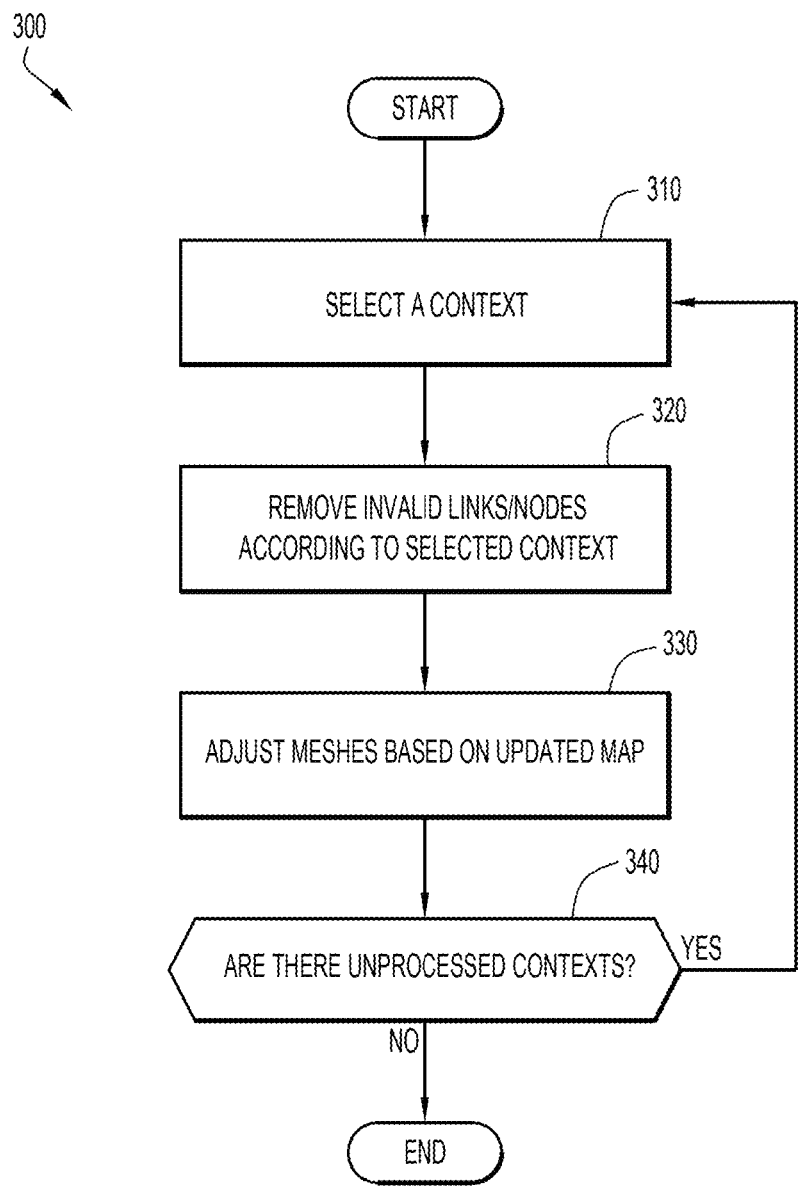
FIG. 3 is a flow chart depicting a method of generating a context-specific partition layer in accordance with an embodiment of the present invention.

FIG. 3 is a flow chart depicting a method 300 of generating a context-specific partition layer in accordance with an embodiment of the present invention.

A context is selected at operation 310. The context may include any information that can indicate whether particular links or nodes are relevant for a route. A context may include a time of day and/or a day of the week, a weather condition, a vehicle type, a traffic quantity, and the like, as each of these conditions can affect whether a vehicle can traverse particular links and nodes. For example, some roadways in a geographical area may consistently become congested at certain times of day or in the presence of certain weather conditions, such as rain or snow. Similarly, some vehicle types may not be permitted to use specific roadways due to height and/or weight restrictions. Context analysis module 160 may select and process each context to generate a partition layer that is specific to a particular context or a combination of contexts.

Invalid links and nodes are removed according to the selected context at operation 320. Context analysis module 160 may determine which links and nodes can be removed from a map due to the selected context. Context analysis module 160 may determine the validity of a link or a node by analyzing prior traffic data to identify patterns. For example, data collected from client devices 105A-105N may indicate that traffic in a particular link becomes stationary at a particular time of a day or during heavy rainfall. In some embodiments, validity information may be provided for links and nodes that identifies particular contexts in which a link or node may be invalid.

Meshes are adjusted based on an updated map at operation 330. In some embodiments, map module 150 receives a listing of invalid links and/or nodes from context analysis module 160, and map module 150 removes any invalid links or nodes to generate an updated map. Partition module 155 may then adjust meshes for a partition layer of the map accordingly so that the partition layer is updated to reflect the removal of links and nodes. In some embodiments, partition module 155 may generate a partition layer that is specific to one or more contexts in the same manner that partition module 155 generates a partition layer using a static division method, except that the context-specific partition layer accounts for links and nodes that are invalid due to one or more contexts.

Operation 340 determines whether there are any remaining unprocessed contexts. If there are remaining contexts that have not yet been processed, a next context is selected for processing at operation 310.

Figure 4:
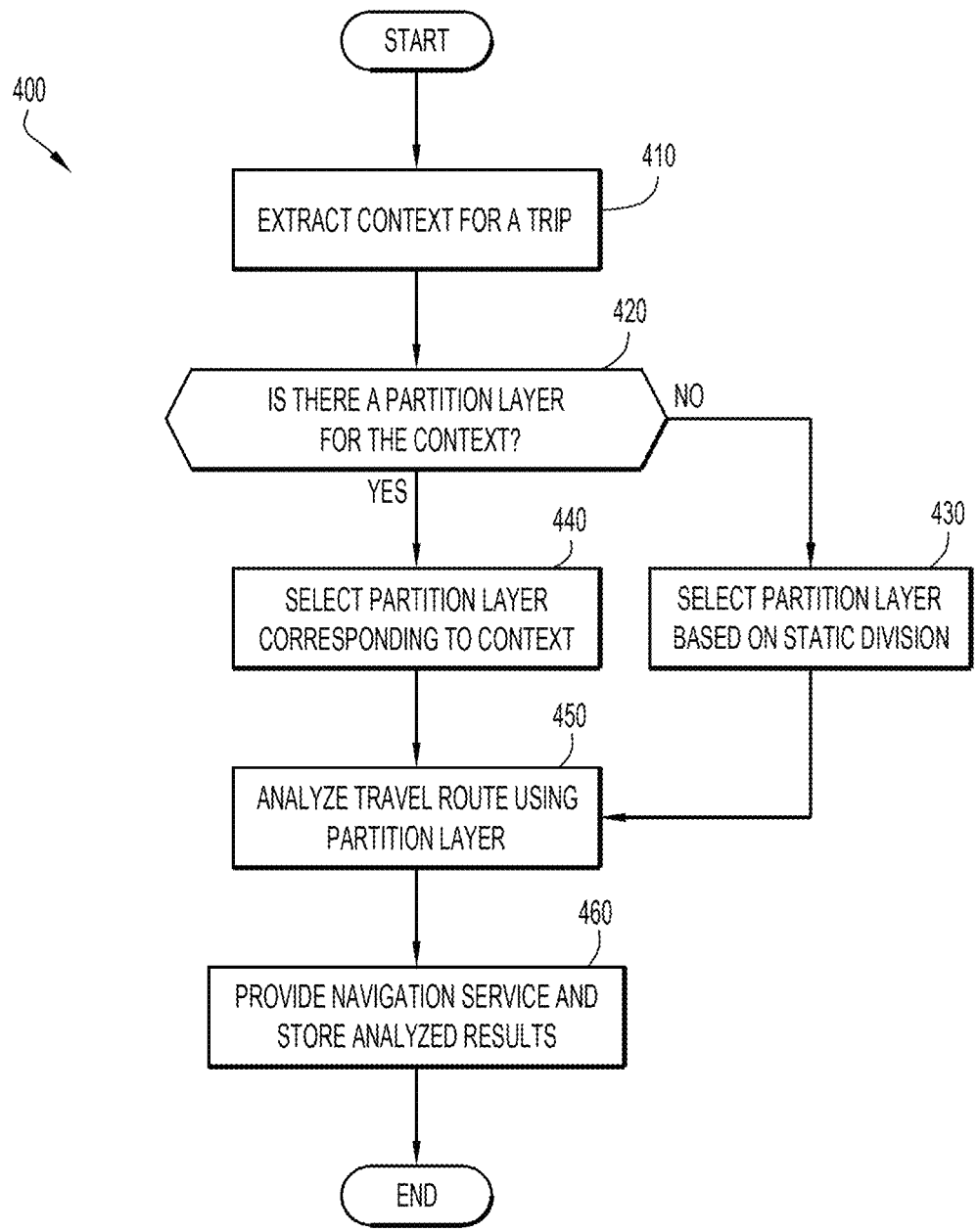
FIG. 4 is a flow chart depicting a method of providing a navigation service in accordance with an embodiment of the present invention.

FIG. 4 is a flow chart depicting a method 400 of providing a navigation service in accordance with an embodiment of the present invention.

A context is extracted for a trip at operation 410. A context may include a time of day and/or a day of the week, a weather condition, a vehicle type, and a traffic quantity. Each context may be received by a client device, such as client device 105A, for a particular trip. When a user provides a trip destination to a client device, navigation application 130 may send information relating to one or more contexts for the trip to trajectory analysis server 140. For example, when a user initiates a trip via navigation application 130, navigation application 130 may transmit user-provided information about the user's vehicle (e.g., weight, size, make and model information, etc.) as well as a destination to trajectory analysis server 140. In some embodiments, each route is received from a client device, such as client devices 105A-105N. The routes may share an origin and a destination, but may traverse different paths. For example, two routes may span from a first location to a second location, but may take different roadways in between.

Additionally, route data may be analyzed by map module 150 to identify a plurality of routes of users that share a same context, origin, and destination. The trajectories of routes may be assigned into a map by map module 150, and coordinate sequences may be extracted for each trajectory that identify the meshes through which each trajectory passes. Thus, similar trajectories may be grouped together as members of a same pattern for the purpose of providing navigation services. When users share trajectories, the users may be provided with one or more navigation services that are based on a same partition layer of a map, thereby saving computing resources.

Operation 420 determines whether there is a partition layer for the context. If there is a partition layer for the context of the trip, then that context-specific partition layer is selected at operation 440. Otherwise, a partition layer based on a static division method is selected at operation 430.

The travel route is analyzed using the selected partition layer at operation 450. The travel route may be analyzed by one or more navigation services based on the partition layer that is selected for the route. One or more computations may be performed for each mesh in the partition layer to provide a navigation service at operation 460. In some embodiments, the computations for each mesh may be parallelized; since each mesh contains a same number of links and nodes, the processing requirements for each mesh are approximately equal. Navigation services may include services such as real-time danger avoidance and future traffic prediction. For example a mesh-by-mesh analysis of traffic conditions may enable a navigation service to anticipate traffic congestion and modify a route to avoid the identified congested area. In some embodiments, processed results may be stored for the identification of traffic patterns in the future in order to provide more accurate navigation services. One or more navigation services may analyze traffic trajectory patterns for each mesh by processing information relating to the trajectories of vehicles, which can be provided by client devices 105A-105N. For example, each client device 105A-105N may provide a location and/or a velocity for processing by trajectory analysis server 140 and its modules.

FIGS. 5A and 5B are maps presented with partition layers in accordance with an embodiment of the present invention. Map 500 depicts a geographical area including an initial partition layer in which each mesh is a same size. For example, mesh 505 is the same size as every other mesh in the initial layer. Once the initial layer is processed according to presented embodiments, some meshes may be merged together to generate a partition layer. Map 550 depicts the same geographical area with a partition layer comprising meshes of various sizes. For example, while meshes 555 and 560 are different sizes, both meshes may contain a same number of links and/or nodes.

Figure 6B:
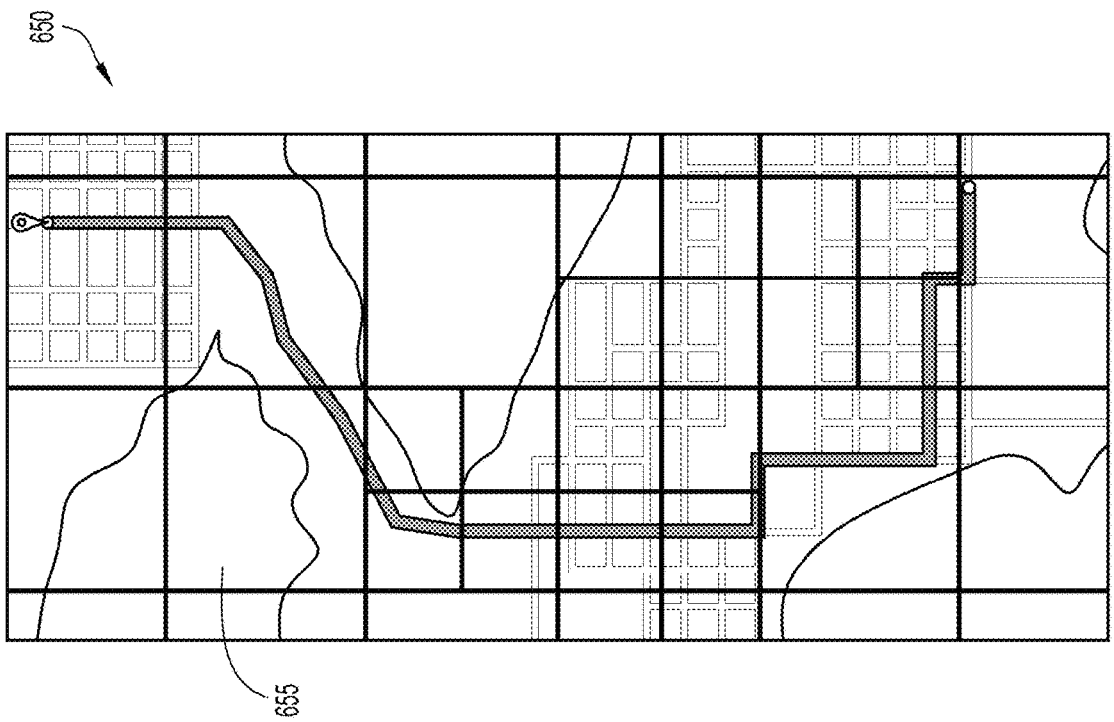
FIGS. 6A and 6B are map representations presented with partition layers in accordance with an embodiment of the present invention.
Figure 6A:
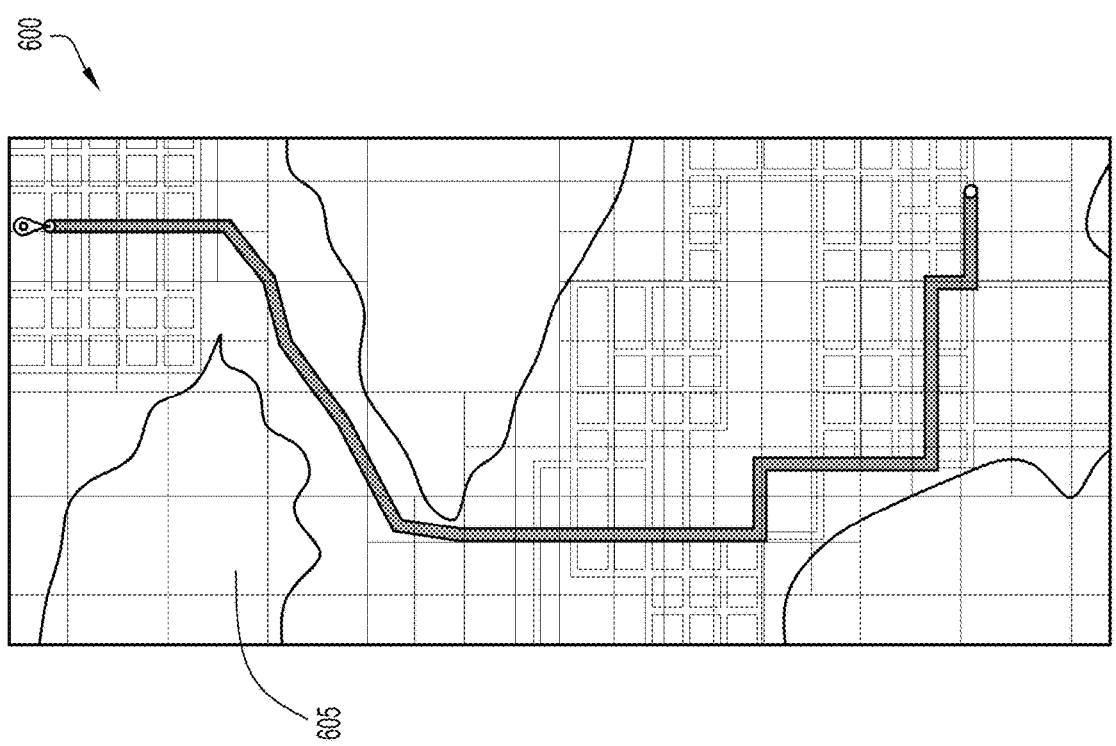

FIGS. 6A and 6B are map representations presented with partition layers in accordance with an embodiment of the present invention. Map 600 depicts a geographical area including a partition layer that is produced according to a static division method, as presented herein. In contrast, map 650 depicts the same geographical area with a context-specific partition layer. The partition layer of map 600 may be processed to generate the context-specific partition layer of map 650 by removing links and nodes that are rendered invalid due to a particular context. For example, context analysis module 160 may determine that some links and/or nodes may be removed from mesh 605 and adjacent meshes, enabling partition module 155 to merge the meshes into a larger mesh 655.

Figure 7:
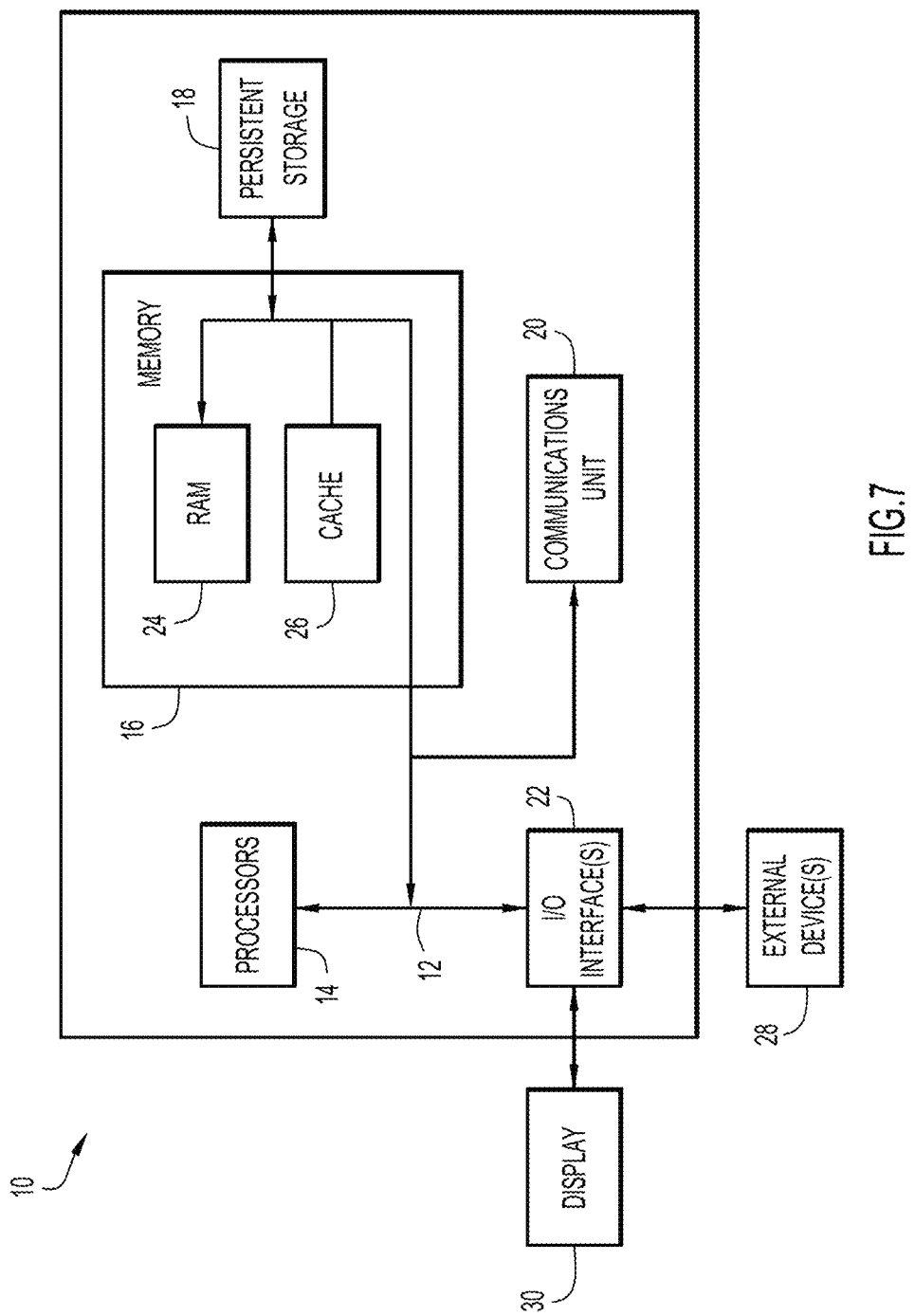
FIG. 7 is a block diagram depicting a computing device in accordance with an embodiment of the present invention.

FIG. 7 is a block diagram depicting components of a computer 10 suitable for executing the methods disclosed herein. Computer 10 may implement client devices 105A-105N, trajectory analysis server 140, and/or database server 170 in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to providing navigation services using context-aware trajectory analysis (e.g., map information, context information, trajectory information, route information, navigation service information, vehicle information, etc.) may be stored within any conventional or other data structures (e.g., files, arrays, lists, stacks, queues, records, etc.) and may be stored in any desired storage unit (e.g., database, data or other repositories, queue, etc.). The data transmitted between client devices 105A-105N, trajectory analysis server 140, and/or database server 170 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to providing navigation services using context-aware trajectory analysis (e.g., map information, context information, trajectory information, route information, navigation service information, vehicle information, etc.) may include any information provided to, or generated by, client devices 105A-105N, trajectory analysis server 140, and/or database server 170. Data relating to providing navigation services using context-aware trajectory analysis may include any desired format and arrangement, and may include any quantity of any types of fields of any size to store any desired data. The data relating to providing navigation services using context-aware trajectory analysis may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to providing navigation services using context-aware trajectory analysis), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing navigation services using context-aware trajectory analysis.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, networking software, navigation application 130, map module 150, partition module 155, context analysis module 160, etc.). These systems may include any types of monitors and input devices (e.g., keyboard, mouse, voice recognition, etc.) to enter and/or view information.

It is to be understood that the software (e.g., server software, networking software, navigation application 130, map module 150, partition module 155, context analysis module 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, networking software, navigation application 130, map module 150, partition module 155, context analysis module 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to providing navigation services using context-aware trajectory analysis). The database system may be implemented by any number of any conventional or other databases, data stores or storage structures (e.g., files, databases, data structures, data or other repositories, etc.) to store information (e.g., data relating to providing navigation services using context-aware trajectory analysis). The database system may be included within or coupled to the server and/or client systems. The database systems and/or storage structures may be remote from or local to the computer or other processing systems, and may store any desired data (e.g., data relating to providing navigation services using context-aware trajectory analysis).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for providing navigation services, the method comprising:
processing route data to extract a plurality of routes, wherein each route comprises a plurality of links and nodes;
generating a partition layer for a map including the plurality of links and nodes of the routes, wherein the partition layer comprises a plurality of meshes each containing one or more links and nodes of the plurality of links and nodes, wherein generating the partition layer further comprises:
providing an initial layer comprising a plurality of meshes of equal size;
identifying pairs of adjacent meshes, wherein each pair includes at least one mesh without any links and nodes; and
merging each identified pair of adjacent meshes;
processing a context to remove invalid links and nodes from the map based on the context;
updating the partition layer by merging a subset of the plurality of meshes in response to the removal of the invalid links and nodes, wherein the subset comprises one or more meshes from which the invalid links and nodes are removed; and
providing a navigation service for the plurality of routes based on the updated partition layer of the map, wherein computations for the navigation service are parallelized on a mesh-by-mesh basis using the merged meshes of the updated partition layer.

2. The computer-implemented method of claim 1, wherein the navigation service comprises one or more of: real-time danger avoidance, and future traffic prediction.

3. The computer-implemented method of claim 1, wherein the context is one or more of: a time and a day of a week, a weather condition, a vehicle type, and a traffic quantity.

4. The computer-implemented method of claim 1, wherein generating the partition layer further comprises:
iteratively identifying and merging pairs of adjacent meshes of the initial layer until each mesh that does not contain any links and nodes has been merged at least once.

5. The computer-implemented method of claim 4, wherein merging a pair of adjacent meshes generates a merged mesh having a level of granularity that is coarser than the levels of granularity of the meshes of the pair of adjacent meshes.

6. The computer-implemented method of claim 1, wherein a shape of a mesh of the plurality of meshes comprises a quadrilateral.

7. The computer-implemented method of claim 1, wherein the subset of the plurality of meshes comprises one or more groups of meshes, wherein each group of meshes collectively includes a same number of links and nodes as a mesh in the group that has a highest number of links and nodes.

8. The computer-implemented method of claim 1, wherein the plurality of routes share a same origin and destination.

9. The computer-implemented method of claim 1, wherein the route data is received from a plurality of mobile devices, and wherein the route data received from each mobile device comprises one or more of: a location of the mobile device, and a velocity of the mobile device.

10. A computer system for providing navigation services, the computer system comprising:
one or more computer processors;
one or more computer readable storage media;
program instructions stored on the one or more computer readable storage media for execution by at least one of the one or more computer processors, the program instructions comprising instructions to:
process route data to extract a plurality of routes, wherein each route comprises a plurality of links and nodes;
generate a partition layer for a map including the plurality of links and nodes of the routes, wherein the partition layer comprises a plurality of meshes each containing one or more links and nodes of the plurality of links and nodes, wherein the program instructions to generate the partition layer further comprise instructions to:
provide an initial layer comprising a plurality of meshes of equal size;
identify pairs of adjacent meshes, wherein each pair includes at least one mesh without any links and nodes; and
merge each identified pair of adjacent meshes;
process a context to remove invalid links and nodes from the map based on the context;
update the partition layer by merging a subset of the plurality of meshes in response to the removal of the invalid links and nodes, wherein the subset comprises one or more meshes from which the invalid links and nodes are removed; and
provide a navigation service for the plurality of routes based on the updated partition layer of the map, wherein computations for the navigation service are parallelized on a mesh-by-mesh basis using the merged meshes of the updated partition layer.

11. The computer system of claim 10, wherein the navigation service comprises one or more of: real-time danger avoidance, and future traffic prediction.

12. The computer system of claim 10, wherein the context is one or more of: a time and a day of a week, a weather condition, a vehicle type, and a traffic quantity.

13. The computer system of claim 10, wherein the instructions to generate the partition layer further comprise instructions to:
iteratively identify and merge pairs of adjacent meshes of the initial layer until each mesh that does not contain any links and nodes has been merged at least once.

14. The computer system of claim 13, wherein the instructions to merge a pair of adjacent meshes comprise instructions to generate a merged mesh having a level of granularity that is coarser than the levels of granularity of the meshes of the pair of adjacent meshes.

15. The computer system of claim 10, wherein the subset of the plurality of meshes comprises one or more groups of meshes, wherein each group of meshes collectively includes a same number of links and nodes as a mesh in the group that has a highest number of links and nodes.

16. The computer system of claim 10, wherein the plurality of routes share a same origin and destination.

17. The computer system of claim 10, wherein the route data is received from a plurality of mobile devices, and wherein the route data received from each mobile device comprises one or more of: a location of the mobile device, and a velocity of the mobile device.

18. A computer program product for providing navigation services, the computer program product comprising one or more computer readable storage media collectively having program instructions embodied therewith, the program instructions executable by a computer to cause the computer to:
process route data to extract a plurality of routes, wherein each route comprises a plurality of links and nodes;
generate a partition layer for a map including the plurality of links and nodes of the routes, wherein the partition layer comprises a plurality of meshes each containing one or more links and nodes of the plurality of links and nodes, wherein generating the partition layer further comprises:
providing an initial layer comprising a plurality of meshes of equal size;
identifying pairs of adjacent meshes, wherein each pair includes at least one mesh without any links and nodes; and
merging each identified pair of adjacent meshes;
process a context to remove invalid links and nodes from the map based on the context;
update the partition layer by merging a subset of the plurality of meshes in response to the removal of the invalid links and nodes, wherein the subset comprises one or more meshes from which the invalid links and nodes are removed; and
provide a navigation service for the plurality of routes based on the updated partition layer of the map, wherein computations for the navigation service are parallelized on a mesh-by-mesh basis using the merged meshes of the updated partition layer.

19. The computer program product of claim 18, wherein the navigation service comprises one or more of: real-time danger avoidance, and future traffic prediction.

20. The computer program product of claim 18, wherein the context is further includes one or more of: a time and a day of a week, a weather condition, a vehicle type, and a traffic quantity.

21. The computer program product of claim 18, wherein the instructions to generate the partition layer further comprise instructions to:
iteratively identify and merge pairs of adjacent meshes of the initial layer until each mesh that does not contain any links and nodes has been merged at least once.

22. The computer program product of claim 21, wherein the instructions to merge a pair of adjacent meshes comprise instructions to generate a merged mesh having a level of granularity that is coarser than the levels of granularity of the meshes of the pair of adjacent meshes.

23. The computer program product of claim 18, wherein the subset of the plurality of meshes comprises one or more groups of meshes, wherein each group of meshes collectively includes a same number of links and nodes as a mesh in the group that has a highest number of links and nodes.

24. The computer program product of claim 18, wherein the plurality of routes share a same origin and destination.

25. The computer program product of claim 18, wherein the route data is received from a plurality of mobile devices, and wherein the route data received from each mobile device comprises one or more of: a location of the mobile device, and a velocity of the mobile device.

* * * * *